(12) United States Patent
Lindback

(10) Patent No.: US 6,698,533 B2
(45) Date of Patent: Mar. 2, 2004

(54) PORTABLE POWER TOOL WITH GREASE LUBRICATED ANGLE DRIVE

(75) Inventor: Tobias Axel Lindback, Huddinge (SE)

(73) Assignee: Atlas Copco Tools AB, Nacka (SE)

( * ) Notice: Subject to any disclaimer, the term of this patent is extended or adjusted under 35 U.S.C. 154(b) by 97 days.

(21) Appl. No.: 10/000,889

(22) Filed: Nov. 15, 2001

(65) Prior Publication Data

US 2002/0112570 A1 Aug. 22, 2002

(30) Foreign Application Priority Data

Nov. 15, 2000 (SE) .............................................. 0004175

(51) Int. Cl.[7] .............................................. E21B 17/10
(52) U.S. Cl. ........................ 173/213; 173/171; 184/6.12
(58) Field of Search ................................ 173/213, 216, 173/218, 171, DIG. 3, 127; 30/123.4; 184/6.12, 6.14, 27.1

(56) References Cited

U.S. PATENT DOCUMENTS

| | | | | |
|---|---|---|---|---|
| 2,741,275 A | * | 4/1956 | Johnsen et al. ............ 30/123.4 |
| 3,630,293 A | * | 12/1971 | Moores, Jr. ................. 173/117 |
| 4,190,116 A | * | 2/1980 | O'Neal et al. ................ 173/38 |
| 4,403,679 A | * | 9/1983 | Snider ........................ 184/64 |
| 4,576,240 A | * | 3/1986 | Matsumoto ................. 173/105 |
| 6,000,140 A | * | 12/1999 | Nickels et al. ............... 30/388 |
| 6,109,366 A | * | 8/2000 | Jansson et al. ............. 173/216 |
| 6,120,362 A | * | 9/2000 | Etter et al. .................. 451/354 |
| 6,224,304 B1 | * | 5/2001 | Smith et al. ................ 409/182 |
| 2002/0073551 A1 | * | 6/2002 | Goodwin .................... 30/123.4 |

* cited by examiner

Primary Examiner—Rinaldi I. Rada
Assistant Examiner—Gloria R. Weeks
(74) Attorney, Agent, or Firm—Frishauf, Holtz, Goodman & Chick, P.C.

(57) ABSTRACT

A portable power tool is provided which includes a housing having an angle drive chamber, a rotation motor, an output spindle, and a grease lubricated angle drive that is located in the angle drive chamber and that includes a drive pinion connected to the motor and a bevel gear connected to the output spindle. The portable power tool also includes an output spindle arresting device which includes a number of recesses in the bevel gear and a latch pawl movably supported in the housing for movement between an inactive position and an active position to engage the recesses in the bevel gear, wherein a grease moving element is connected to the latch pawl to be moved and displace grease from one part of the angle drive chamber to another as the latch pawl is shifted from its inactive position to its active position.

6 Claims, 2 Drawing Sheets

PORTABLE POWER TOOL WITH GREASE LUBRICATED ANGLE DRIVE

BACKGROUND OF THE INVENTION

This invention relates to a portable power tool having a rotation motor driving an output spindle via an angle drive located in an angle drive chamber partly filled with lubricating grease.

This type of tool is very common and is used for grinding tools, power nutrunners, boring machines etc. Either electrically or pneumatically powered these tools suffer from the problem of having a limited service life of the angle drive mainly due to poor lubrication. This problem is particularly significant at fast rotating tools like grinding tools.

The angle drive of such a power tool is lubricated by grease which is added to the angle drive chamber at the assembly of the tool and/or added at certain operation intervals. Grease fitted at the assembly of the tool will after a relatively short time of operation be thrown off the gear teeth and be deposited on the angle drive chamber walls. Also grease added at certain operation intervals will be thrown off the gear teeth after a relatively short time of tool operation. To ensure a satisfactory lubrication of the angle drive grease should have to be added at very short operation intervals, which would be a rather awkward and time consuming maintenance procedure. Besides, if too large an amount of grease were added to the angle drive chamber there would be an undesired heat development due to internal viscous friction in the grease. This means that you can add grease a few times only before the total amount of grease becomes too large.

Using oil instead of grease would perhaps improve lubrication of the angle drive, but would instead create a difficult seal problem to solve, namely how to safely keep the oil inside the angle drive chamber during a long enough tool operation time.

OBJECT OF THE INVENTION

The main object of the invention is to accomplish a device for repeated redistribution of the grease once supplied to the angle drive chamber such that the grease will be repeatedly moved from those surfaces of the angle drive chamber where it tends to be deposited during operation of the tool toward the gear teeth of the angle drive.

Another object of the invention is to accomplish a device for repeated redistribution of grease which is compact and simple in design and which does not require redesign of a standard type angle drive housing.

Further objects and advantages of the invention will appear from the following specification and claims.

A preferred embodiment of the invention is described in detail below with reference to the accompanying drawings.

DETAILED DESCRIPTION

Figure 1:
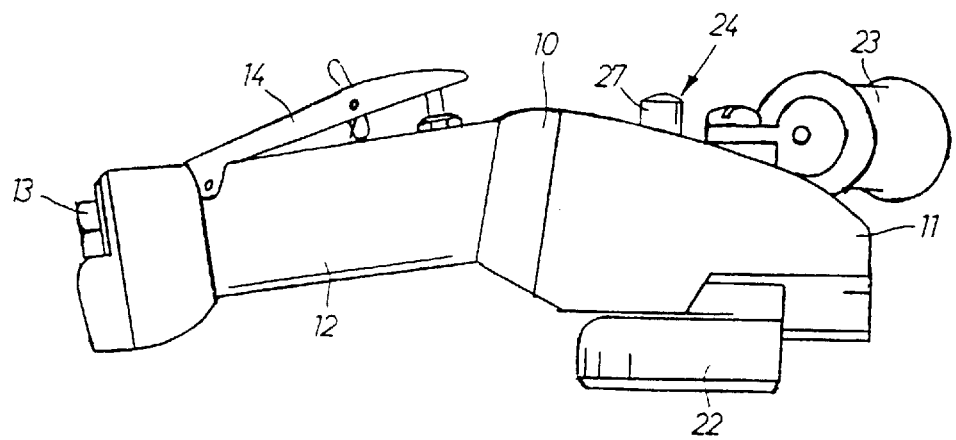
FIG. 1 shows a side view of a portable angle grinder provided with a grease distribution device according to the invention.
Figure 2:
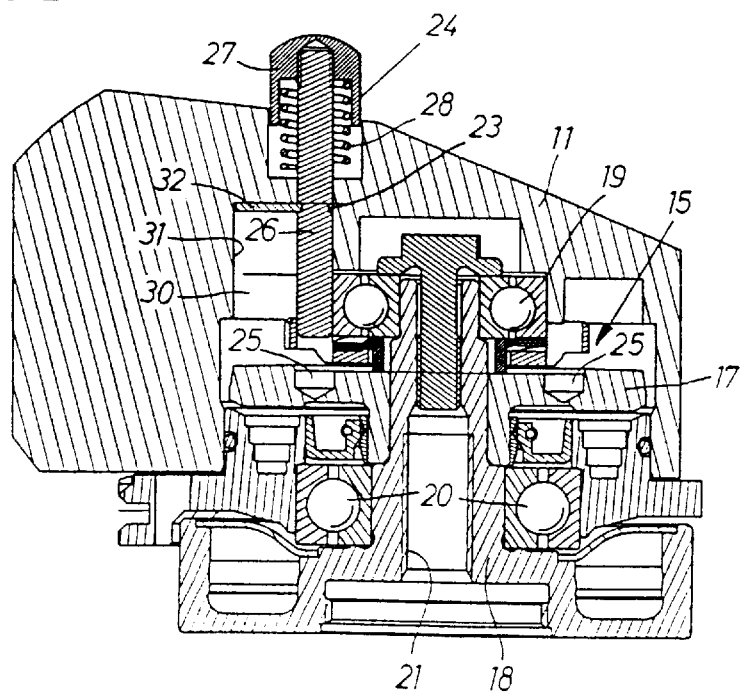
FIG. 2 shows a longitudinal section through the angle head of the angle grinder in FIG. 1.
Figure 3:
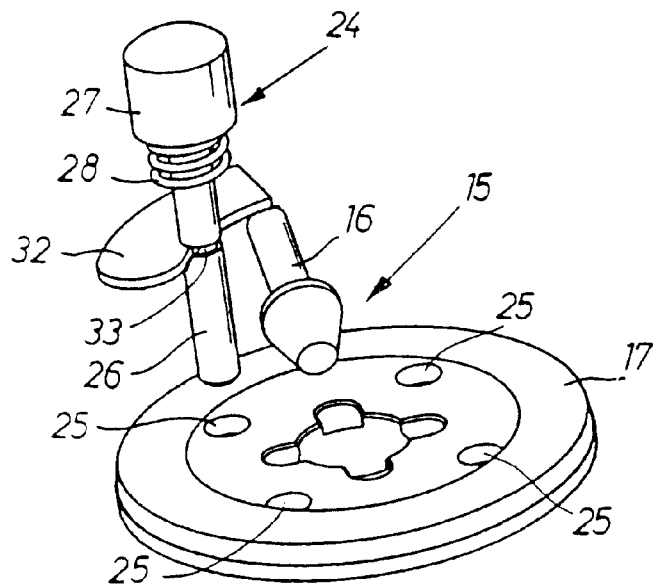
FIG. 3 shows a perspective view of the angle drive and the grease distribution device according to the invention.

The power tool shown in the drawing figures is an angle grinder which comprises a housing 10 with a forward angle drive section 11 and a rear operator handle 12. The housing 10 encloses a pneumatic rotation motor (not shown) supplied with motive pressure air from a pressure air source via a conduit connection 13 at the rear end of the handle 12 and a supply valve maneuvered by a lever 14.

In the angle drive section 12 of the housing 10 there is an angle drive 15 comprising a drive pinion 16 and a bevel gear 17. The drive pinion 16 is connected to the motor whereas the bevel gear 17 is attached to and rotatively locked relative to an output spindle 18. The output spindle 18 is journalled in the angle drive housing section 11 by means of two ball bearings 19, 20 and is formed with a threaded front end portion 21 for attachment of a working implement, such as a grinding wheel. There is also provided a wheel guard 22 for protection from an attached and rotating grinding wheel and an auxiliary front handle 23 for facilitate handling of the grinder.

The angle drive section 11 of the grinder housing 10 is also provided with an output shaft arresting device 24 comprising a number of recesses in the form of blind bores 25 in the bevel gear 17. These blind bores 25 are disposed on a circle coaxial with the rotation axis of the output spindle 18, and a latch pawl 26 longitudinally displaceable in the housing section 12 in a parallel but offset disposition relative to the output spindle 18. The latch pawl 26 extends out of the housing section 12 and is provided with a press button 27 at its rear end for manual operation by the tool operator. The forward or inner end of the latch pawl 26 is arranged to engage anyone of the blind bores 25 in the bevel gear 17 to arrest the output spindle 18 at working implement mounting and removal operations. This is obtained by shifting the latch pawl 26 from a rear inactive position to a forward active position. A spring 28 is provided under the press button 27 for applying a retracting force on the latch pawl 26, thereby keeping the latch pawl 26 out of engagement with the recesses 25 of the bevel gear 17 during operation of the tool.

Figure 4:
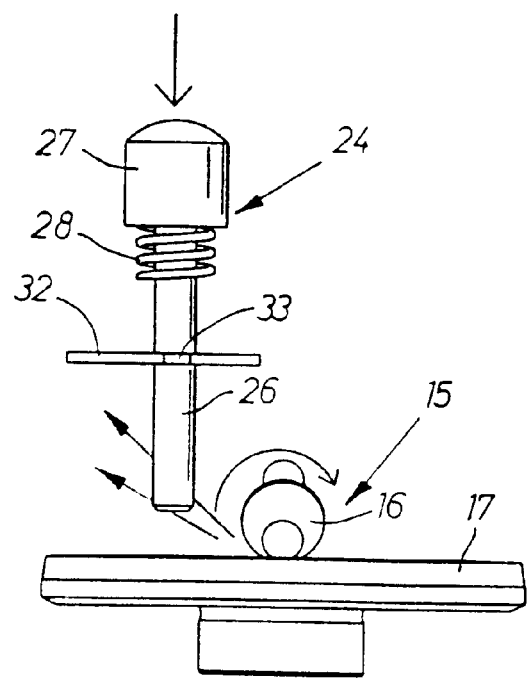
FIG. 4 shows a schematic illustration of the angle drive and the grease distribution device according to the invention.

The forward housing section 11 comprises an angle drive chamber 30 which encloses the angle drive 15 and which at the assembly of the tool is partly filled with grease for lubrication of the angle drive 15. During operation of the tool, however, the grease is thrown off the teeth of the drive pinion 16 and the bevel gear 17, which means that the angle drive 15 losses its lubrication after some time of operation. The fast rotating drive pinion 16 acts like a centrifugal impeller as it throws the grease off the gear teeth. This is illustrated by arrows in Fig. 4. As a result, the grease will be deposited on one of the walls 31 of the angle drive chamber 30.

In order to return at least a major part of the grease deposited on the chamber wall 31 to the gear teeth of the angle drive 15, the latch pawl 26 is provided with a grease moving element in the form of a scraper 32 which is arranged to be moved along the chamber wall 31 by the latch pawl 26 to thereby scrape the deposited grease down the wall 31 towards the bevel gear 17. On its inner edge, the scraper 32 is formed with a recess which is brought into a snapping engagement with a circumferential groove 33 on the latch pawl 26, thereby securing the scraper 32 to the latch pawl 26.

In operation of the grinder, grinding wheels attached to the output spindle 18 are successively worn down and have to be replaced at certain intervals. Each time a grinding wheel is mounted or removed from output spindle 18, the spindle 18 has to be locked against rotation for enable loosening or tightening of the threaded grinding wheel retaining element engaging the threaded spindle end 21. Simultaneously with pressing the button 27 and moving the latch pawl 26 into locking engagement with the recesses 25 in the bevel gear 17, the scraper 32 is moved along the chamber wall 31 scraping down the grease deposited thereon during the preceding grinder operation. Since grinding wheels during full time grinder operation have to be replaced several times a day, grease is likewise reapplied on the teeth of the angle drive 15 several times a day. Should the grinder be less intensively used, there is ensured anyway that the angle drive 15 gets a grease reapplication each time a grinding wheel is attached to or removed from the grinder.

It is to be understood that the embodiments of the invention are not limited to the above described example but may be freely varied with in the scope of the claims.

Accordingly, the grease moving scraper element does not have to be supported on the latch pawl 26 but could be arranged otherwise in the angle drive chamber 30. The important thing is that the scraper element is displaced along the chamber wall by means of the latch pawl each time the latter is shifted from its inactive position to its activated position, such that a reapplication of grease onto the angle drive gear teeth is obtained at regular intervals.

What is claimed is:

1. A portable power tool comprising:
   a housing;
   a rotation motor;
   a drive pinion connected to said motor;
   an output spindle disposed at an angle to said drive pinion; and
   a bevel gear attached to said output spindle, said bevel gear and said drive pinion together forming an angle drive; and
   an output spindle arresting device comprising a number of recesses in said bevel gear, and a latch pawl movably supported in said housing and manually shiftable from an inactive position to an activate position to engage one of said recesses to arrest said bevel gear and said output spindle against rotation;
   wherein said housing comprises an angle drive chamber enclosing said angle drive and being partly filled with lubricating grease; and
   wherein a grease displacing element is connected to said latch pawl and arranged to re-locate grease from one part of said angle drive chamber to another part of said angle drive chamber when said latch pawl is shifted from said inactive position to said activated position.

2. A portable power tool according to claim 1, wherein said latch pawl extends from outside said housing into said angle drive chamber and is formed with a press button at an outer end, and said grease displacing element is movable by said latch pawl along an inner wall of said angle drive chamber so as to scrape grease along said inner wall toward said bevel gear.

3. A portable power tool comprising:
   a housing;
   a rotation motor;
   a drive pinion connected to said motor;
   an output spindle disposed at an angle to said drive pinion; and
   a bevel gear attached to said output spindle, said bevel gear and said drive pinion together forming an angle drive; and
   an output spindle arresting device comprising a number of recesses in said bevel gear, and a latch pawl movably supported in said housing and manually shiftable from an inactive position to an activate position to engage one of said recesses to arrest said bevel gear and said output spindle against rotation;
   wherein said housing comprises an angle drive chamber enclosing said angle drive and being partly filled with lubricating grease;
   Wherein a grease displacing element is connected to said latch pawl and arranged to re-locate grease from one part of said angle drive chamber to another part of said angle drive chamber when said latch pawl is shifted from said inactive position to said activated position; and
   wherein said grease displacing element comprises a sheet metal element rigidly attached to said latch pawl.

4. A portable power tool according to claim 3, wherein said recesses in said bevel gear comprise a number of bores arranged in a circular configuration concentric with a rotation axis of said output spindle.

5. A portable power tool comprising:
   a housing;
   a rotation motor;
   a drive pinion connected to said motor;
   an output spindle disposed at an angle to said drive pinion; and
   a bevel gear attached to said output spindle, said bevel gear and said drive pinion together forming an angle drive; and
   an output spindle arresting device comprising a number of recesses in said bevel gear, and a latch pawl movably supported in said housing and manually shiftable from an inactive position to an activate position to engage one of said recesses to arrest said bevel gear and said output spindle against rotation;
   wherein said housing comprises an angle drive chamber enclosing said angle drive and being partly filled with lubricating grease;
   wherein a grease displacing element is connected to said latch pawl and arranged to re-locate grease from one part of said angle drive chamber to another part of said angle drive chamber when said latch pawl is shifted from said inactive position to said activated position; and
   wherein said recesses in said bevel gear comprise a number of bores arranged in a circular configuration concentric with a rotation axis of said output spindle.

6. A portable power tool comprising:
   a housing;
   a rotation motor;
   a drive pinion connected to said motor;
   an output spindle disposed at an angle to said drive pinion; and
   a bevel gear attached to said output spindle, said bevel gear and said drive pinion together forming an angle drive; and
   an output spindle arresting device comprising a number of recesses in said bevel gear, and a latch pawl movably supported in said housing and manually shiftable from an inactive position to an activate position to engage one of said recesses to arrest said bevel gear and said output spindle against rotation;
   wherein said housing comprises an angle drive chamber enclosing said angle drive and being partly filled with lubricating grease;

wherein a grease displacing element is connected to said latch pawl and arranged to re-locate grease from one part of said angle drive chamber to another part of said angle drive chamber when said latch pawl is shifted from said inactive position to said activated position;

wherein said latch pawl extends from outside said housing into said angle drive chamber and is formed with a press button at an outer end, and said grease displacing element is movable by said latch pawl along an inner wall of said angle drive chamber so as to scrape grease along said inner wall toward said bevel gear; and wherein said recesses in said bevel gear comprise a number of bores arranged in a circular configuration concentric with a rotation axis of said output spindle.

\* \* \* \* \*